United States Patent
Ohashi et al.

(10) Patent No.: US 8,413,546 B2
(45) Date of Patent: Apr. 9, 2013

(54) POWER TRANSMITTING APPARATUSES

(75) Inventors: Tatsuyuki Ohashi, Hamamatsu (JP); Shouji Asatsuke, Hamamatsu (JP); Makoto Sumi, Hamamatsu (JP); Akio Oishi, Hamamatsu (JP); Keiichi Ishikawa, Hamamatsu (JP)

(73) Assignee: Kabushiki Kaisha F.O.C., Shizuoka (JP)

( * ) Notice: Subject to any disclaimer, the term of this patent is extended or adjusted under 35 U.S.C. 154(b) by 0 days.

(21) Appl. No.: 13/160,425

(22) Filed: Jun. 14, 2011

(65) Prior Publication Data

US 2011/0308909 A1 Dec. 22, 2011

Related U.S. Application Data

(63) Continuation of application No. PCT/JP2009/006860, filed on Dec. 14, 2009.

(30) Foreign Application Priority Data

Dec. 15, 2008 (JP) .................................. 2008-318379

(51) Int. Cl.
*F16H 47/00* (2006.01)

(52) U.S. Cl.
USPC .......................................................... 74/720

(58) Field of Classification Search .................. 74/730.1, 74/731.1, 732.1, 733.1, 718, 720, 665 F, 74/665 G, 665 GA, 665 GD, 330
See application file for complete search history.

(56) References Cited

U.S. PATENT DOCUMENTS

| 3,442,155 A | 5/1969 | Clark |
| 4,036,081 A | 7/1977 | Onuma et al. |

(Continued)

FOREIGN PATENT DOCUMENTS

| JP | 52-47168 | 4/1977 |
| JP | S52-109077 | 9/1977 |

(Continued)

OTHER PUBLICATIONS

Microfilm of the specification and drawings annexed to the request of Japanese Utility Model Application No. 118068/1987 (Laid-open No. 24760/1989), Feb. 10, 1989, Nissan Diesel Motor Co., Ltd.

(Continued)

*Primary Examiner* — David D Le
*Assistant Examiner* — David J Hlavka
(74) *Attorney, Agent, or Firm* — Knobbe, Martens, Olson & Bear LLP (57) ABSTRACT

A power transmitting apparatus, such as an automotive transmission, can be configured to reduce the size of a torque converter as well as improve the flexibility of the torque converter's layout. A power transmitting apparatus configured to transmit power from a driving source of a vehicle to its wheels and can be configured selectively transmit or cutting-off the driving force to the wheels can comprise a torque converter having a torque amplifying function. A clutch mechanism can include a first clutch device to transmit the driving force to the wheels through a power transmitting system of the torque converter and a second clutch to transmit the driving force without the power transmitting system of the torque converter. A selecting device can control the first clutch device or the second clutch device in accordance with conditions of the vehicle including start of a vehicle from a stop. A damping mechanism for damping torque variation can be configured to transmit power between the driving source and the torque converter.

5 Claims, 5 Drawing Sheets

U.S. PATENT DOCUMENTS

| | | | |
|---|---|---|---|
| 4,117,745 A | | 10/1978 | Yokoyama et al. |
| 4,784,019 A | * | 11/1988 | Morscheck ............... 74/720 |
| 4,860,861 A | * | 8/1989 | Gooch et al. ............ 192/3.26 |
| 4,889,012 A | * | 12/1989 | Dull ........................... 475/53 |
| 5,437,584 A | * | 8/1995 | Garrett et al. ............ 475/275 |
| 5,507,372 A | * | 4/1996 | Boardman et al. ...... 192/3.31 |
| 6,705,964 B2 | * | 3/2004 | Nagai et al. ............. 475/216 |
| 6,770,008 B2 | * | 8/2004 | Shinojima et al. ......... 477/71 |

FOREIGN PATENT DOCUMENTS

| | | |
|---|---|---|
| JP | 53-140466 | 12/1978 |
| JP | S63-308266 | 12/1988 |
| JP | S64-024760 | 1/1989 |
| JP | H03-288050 | 12/1991 |
| JP | 09-79346 | 3/1997 |
| JP | 10-78091 | 3/1998 |
| JP | 2005-003193 | 1/2005 |

OTHER PUBLICATIONS

Microfilm of the specification and drawings annexed to the request of Japanese Utility Model Application No. 130982/1975 (Laid-open No. 44977/1977), Mar. 30, 1977, Komatsu Ltd.

International Search Report for PCT/JP2009/006860 mailed Jan. 26, 2010.

\* cited by examiner

| | Clutch | 1st clutch device 3a | 2nd clutch device 3b | 3rd clutch device 8 |
|---|---|---|---|---|
| Forward mode | Torque-converter | ○ | × | × |
| | Starting clutch | ○ | ○ | × |
| Reverse mode | | × | × | ○ | ant
POWER TRANSMITTING APPARATUSES

CROSS-REFERENCE TO RELATED APPLICATIONS

This application is a continuation of PCT Application No. PCT/JP2009/006860, filed on Dec. 14, 2009, which claims priority to Japanese Application No. 2008-318379, filed on Dec. 15, 2008, the entire contents of each of which are hereby incorporated by reference.

BACKGROUND OF THE DISCLOSURE

1. Field of the Disclosure

The present inventions relate to power transmitting apparatuses, such as vehicle transmissions, which transmit power from a driving source of a vehicle to the wheels of the vehicle and which are adapted to properly select transmission of power and cutting-off of power to the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("torque converter type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separated position. Thus, the torque converter cover and the turbine can be directly connected and disconnected via the clutch piston.

SUMMARY OF THE DISCLOSURE

An aspect of at least one of the inventions disclosed herein includes the realization that the above-noted known combined-type apparatuses can be simplified, which can reduce apparatus size. For example, in the above-noted known combination-type apparatus, a lock-up clutch that is movable between the connected position and the non-connected position in the hydraulic atmosphere within the torque converter increases the size of torque converter as well as restricts the available options for laying out the torque converter. In some embodiments of the present inventions, the size of a torque converter of a power transmitting apparatus can be reduced and the flexibility of the layout of the torque converter can be improved, for example.

In accordance with an embodiment, a power transmitting apparatus for selectively transmitting power from a driving source of a vehicle to wheels of the vehicle can comprise a torque converter having a torque amplifying function. A clutch mechanism can comprise a first clutch device configured to transmit the driving force of the driving source to the wheels through the torque converter so as to move the vehicle and a second clutch device configured to transmit the driving force of the driving source to the wheels without the power transmitting system of the torque converter so as to move the vehicle. A selecting device can be configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance with a plurality of different modes of operation of the vehicle, at least one of the modes being a starting mode. A damper mechanism for damping torque variation can be configured to transmit power between the driving source and the torque converter.

In some embodiments, the power transmitting apparatus can comprise a first driving shaft connected to the first clutch device and configured to be rotated by the driving force of the driving source through the torque converter. A second driving shaft can be connected to the second clutch device and configured to be rotated by the driving force of the driving source without the power transmitting system of the torque converter. The first driving shaft and the second driving shaft can be arranged coaxially.

In some embodiments, the clutch mechanism can comprise the first clutch device, the second clutch device, and two hydraulic pistons that correspond respectively to the first and second clutch devices contained in the same housing. The first and second clutch devices can be selectively actuated by controlling the hydraulic pressure for actuating the hydraulic pistons.

In some embodiments, the power transmitting apparatus can comprise an automatic variable speed unit operatively positioned between the clutch mechanism and the wheels to transmit power between them.

In some embodiments, the automatic variable speed unit can comprise a continuously variable speed unit.

In embodiments including a damper mechanism for damping torque variation between the driving source and the torque converter, it is not necessary to include any lock-up clutch or damper mechanism within the torque converter. Thus, the size of the torque converter can be reduced and the freedom of torque converter layout can be improved.

Since the weight (i.e. a primary mass) of a driving source side portion and the portion from the damper mechanism to the driving source can be reduced, the load acting on the driving source can be reduced. Since the weight (i.e. a secondary mass) of a converter side portion and a portion from the damper mechanism to the torque converter can be increased, the vibration damping effect can be increased due to increase of the inertial mass.

In embodiments wherein the selecting device is configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance with a plurality of different modes of operation of the vehicle, at least one of the modes being a starting mode, the power transmitting apparatus can be simplified, the size of the power transmitting apparatus can be reduced, the starting performance can be improved due to the torque amplifying function of the torque converter, and the power transmitting efficiency during steady operation of vehicle can be improved.

In embodiments where the first driving shaft and the second driving shaft are arranged coaxially relative to each other, the whole size of the power transmitting apparatus can be reduced compared prior art structures in which the first and second driving shafts are arranged parallel relative to and spaced from each other.

In embodiments where the clutch mechanism comprises the first clutch device, the second clutch device, and two hydraulic pistons corresponding respectively to the first and second clutch devices all contained in a same housing and the first and second clutch devices can be selectively actuated by controlling the hydraulic pressure for actuating the hydraulic pistons, the power transmitting apparatus can be simplified and the size of whole the power transmitting apparatus can be reduced.

In embodiments where the power transmitting apparatus comprises an automatic variable speed unit configured to transmit power between the clutch mechanism and the wheels, it is possible to easily achieve a preferable driving force as well as a vehicle operation condition that improves fuel consumption.

In embodiments where the automatic variable speed unit comprises a continuously variable speed unit, the driving force and vehicle operation conditions can be continuously adjusted to efficiently achieve the preferable driving force as well as a vehicle operating condition that improve fuel consumption.

DETAILED DESCRIPTION OF THE PREFERRED EMBODIMENTS

Figure 1:
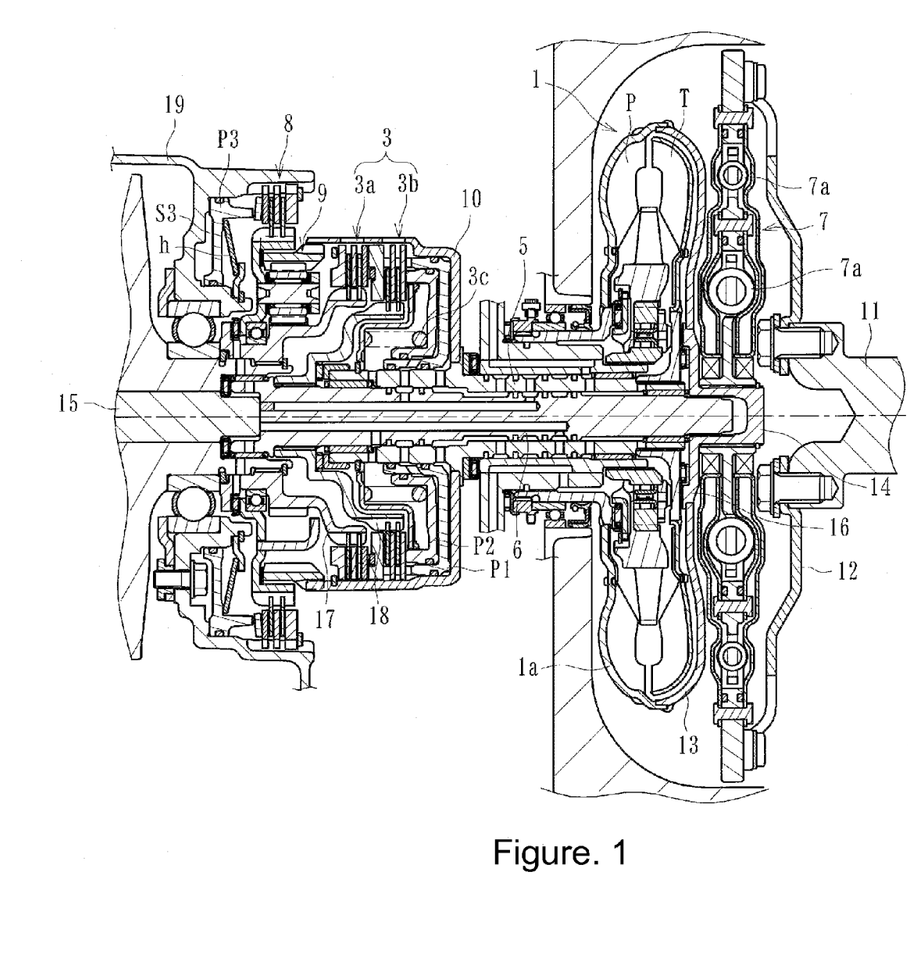
FIG. 1 is a longitudinal-section view illustrating a power transmitting apparatus according to an embodiment.
Figure 2:
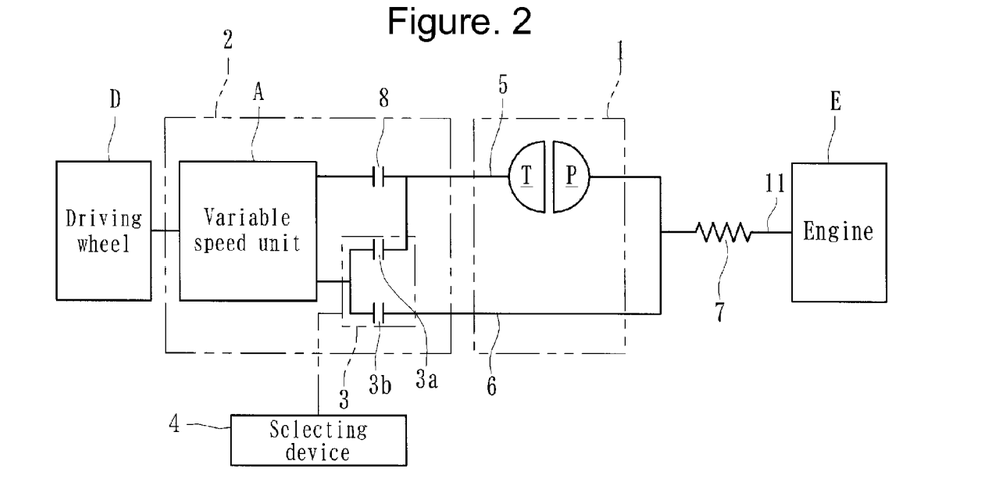
FIG. 2 is a schematic diagram of the power transmitting apparatus of FIG. 1.
Figure 5:
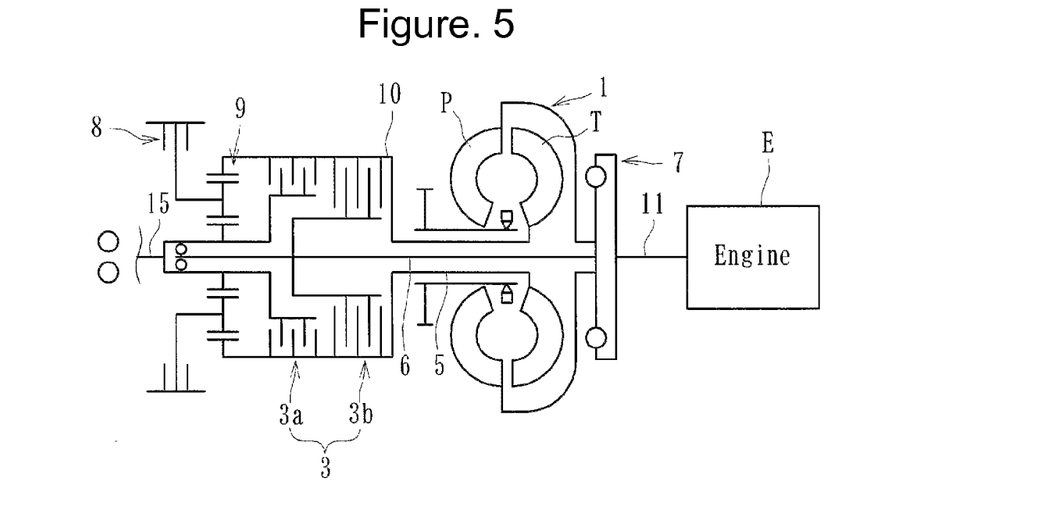
FIG. 5 is a schematic diagram of the power transmitting apparatus of FIG. 1.

FIG. 1 illustrates a first embodiment of a power transmitting apparatus configured to transmit or cut off the driving force of an engine (driving source) of an automobile (vehicle) to a driving wheel (or driving wheels) D. Such an apparatus can comprise, as illustrated in FIGS. 1, 2 and 5, a torque converter 1, a clutch mechanism 3, a selecting device 4, a first driving shaft 5, a second driving shaft 6, a damper mechanism 7, and a third clutch device 8. FIG. 1 is a longitudinal-section view illustrating a main part of the power transmitting apparatus, and FIGS. 2 and 5 are schematic diagrams of the power transmitting apparatus of FIG. 1.

As illustrated in FIGS. 2 and 5, the torque converter 1 and a transmission 2 can be configured to perform as a power transmitting system that transmits power from the engine E as the driving source of a vehicle to the wheels D. The transmission 2 can include the clutch mechanism 3, the third clutch device 8 and a variable speed unit A. As illustrated in FIG. 1, an input shaft 11 can extend from the engine E and an output shaft 15 can extend to the variable speed unit A.

The torque converter 1 can provide a torque amplifying function for amplifying the torque from the engine E and transmitting it to the transmission 2. The torque converter 1 is rotated around its shaft by the driving force transmitted from the engine E. The torque converter 1 can comprise torque converter covers 1a and 13 for containing a liquid (operating oil). A pump P can be formed on the torque converter cover 1a and can thus rotate together with the torque converter. A turbine T can be arranged oppositely to the pump P and rotatable at a side of the torque converter cover 13.

The input shaft 11 can be connected to the torque converter cover 13 through a cover member 12. When the input shaft 11 is rotated by the driving force of the engine E, the cover member 12, the torque converter covers 13 and 1a, and the pump P are rotated. The rotational torque is transmitted to the turbine T through the liquid (operating oil) with the torque being amplified. The turbine T is then rotated by the amplified torque and thus the amplified torque is transmitted to the transmission 2 through a first driving shaft 5 spline-fitted with the turbine T via a connecting member 16. The term "power transmitting system of the torque converter" used herein means a power transmitting system formed by the torque converter cover 1a, the pump P and turbine T.

On the other hand, the torque converter cover 13 is connected to a cover member 12 through the damper mechanism 7 comprising a connecting member 14, and coil springs 7a and the cover member 12. The damper mechanism 7 is further connected to the input shaft 11. Accordingly when the input shaft 11 is rotated by the driving force of the engine E, the cover member 12, the cover member 12, the damper mechanism 7, the torque converter cover 13, the connecting member 16, and the first driving shaft 5 are rotated and thus the driving torque of the engine E is transmitted to the transmission 2.

Accordingly, the first driving shaft 5 can be rotated by the driving force of the engine E through the power transmitting system of the torque converter 1 and can be connected to a first clutch device 3a through a housing 10 and the second driving shaft 6 can be directly rotated by the driving force of the engine E without the power transmitting system of the torque converter 1 and can be connected to a second clutch device 3b. The first driving shaft 5 can be a hollow cylindrical member and the second driving shaft 6 can be rotationally arranged within the first driving shaft 5. That is, the first driving shaft 5 and the second driving shaft 6 can be coaxially arranged. Thus, the first driving shaft 5 can be rotationally arranged around the second driving shaft 6 and, on the other hand, the second driving shaft 6 can be rotatable within the first driving shaft 5. The first driving shaft 5 and the second driving shaft 6 can be independently rotated in accordance with operations selected by the clutch mechanism 3.

The clutch mechanism 3 can comprise the first clutch device 3a operable on advancement of an automobile (vehicle) and adapted to transmit the driving force of the engine (driving source) E to the wheels (driving wheels D) through a power transmitting system of the torque converter 1. A second clutch device 3b can be adapted to transmit the driving force of the engine E to the wheels D without the power transmitting system of the torque converter 1. The first and second clutch devices 3a and 3b respectively can comprise a plurality of driving side clutch discs 3aa and 3ba, and a plurality of driven side clutch discs 3ab and 3bb slidable to right and left directions in drawings, and thus each form multiple disc clutches.

In the first clutch device 3a, the driving side clutch discs 3aa can be mounted on the housing 10 and the driven side clutch discs 3*ab* can be mounted on an interlocking member 17 connected to the output shaft 15, and the driving side clutch discs 3*aa* and the driven side clutch discs 3*ab* can be alternately arranged to form a laminated structure. These driving side clutch discs 3*aa* and the driven side clutch discs 3*ab* can be pressed together and separated from each other to connect and cut-off the power therebetween.

In the second clutch device 3*b*, the driving side clutch discs 3*ba* can be mounted on an interlocking member 18 connected to the second driving shaft 6 and interlocking therewith and the driven side clutch discs 3*bb* can be mounted on the housing 10, and the driving side clutch discs 3*ba* and the driven side clutch discs 3*bb* can be alternately arranged to form a laminated structure. These driving side clutch discs 3*ba* and the driven side clutch discs 3*bb* can be pressed together or separated from each other to transmit or cut off transmission of power between them. The term "separated" used herein means a condition in which a pressure applied to the clutch discs is released while the clutch discs may remain in contact with each other, for example, while slipping. Thus, the term "separated" is not limited only to a physically separated condition. The transmission of driving force is allowed under the press-together condition and cut off under the separated condition.

Figure 3:
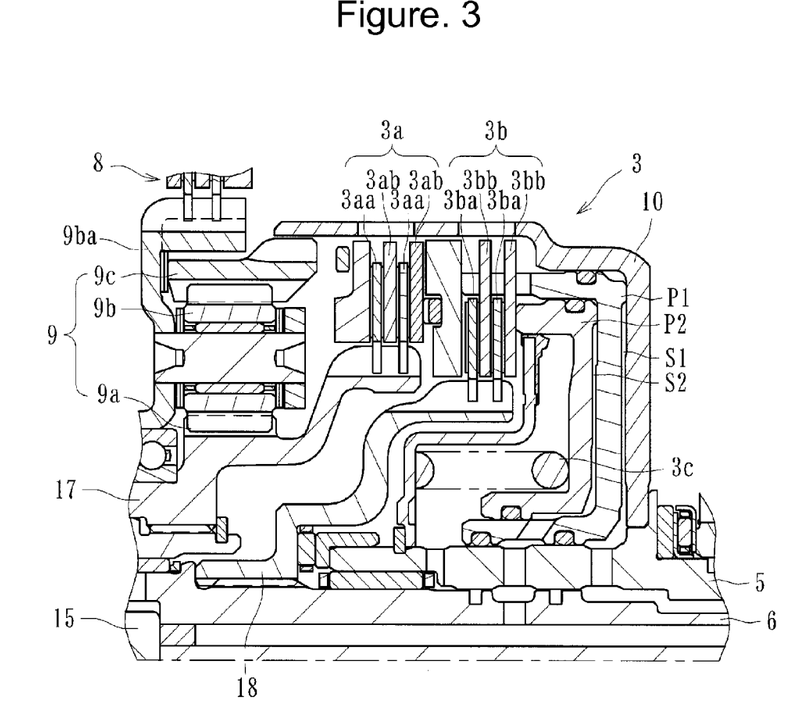
FIG. 3 is an enlarged view illustrating a clutch mechanism of the power transmitting apparatus of FIG. 1.

As illustrated in FIG. 3, the clutch mechanism 3 can comprise the first clutch device 3*a*, the second clutch device 3*b*, and two hydraulic pistons P1 and P2 corresponding respectively to the first and second clutch devices 3*a* and 3*b* contained in the same housing 10. The first and second clutch devices 3*a* and 3*b* can be selectively actuated by controlling the hydraulic pressure for actuating the hydraulic pistons P1 and P2.

For example, the hydraulic piston P1 can be moved toward the left direction in FIG. 3 against an urging force of a return spring 3*c* by supplying operating oil into a hydraulic chamber S1 between the housing 10 and the hydraulic piston P1 and thus the first clutch device 3*a* is pressed by tips formed on the hydraulic piston P1 to press the driving side clutch discs 3*aa* and the driven side clutch discs 3*ab* against each other. The tips formed on the hydraulic piston P1 can be passed through recesses formed on the peripheries of the driving side clutch discs 3*ba* and the driven side clutch discs 3*bb* of the second clutch device 3*b*.

The hydraulic piston P2 can be moved toward the left direction in FIG. 3 against an urging force of a return spring 3*c* by supplying operating oil into a hydraulic chamber S2 between the hydraulic piston P1 and the hydraulic piston P2 and thus the second clutch device 3*b* is pressed by tips formed on the hydraulic piston P2 to press the driving side clutch discs 3*ba* and the driven side clutch discs 3*bb* against each other. Thus, the first clutch device 3*a* and the second clutch device 3*b* can be selectively actuated by controlling the hydraulic pressures operating the hydraulic pistons P1 and P2.

Figure 7:
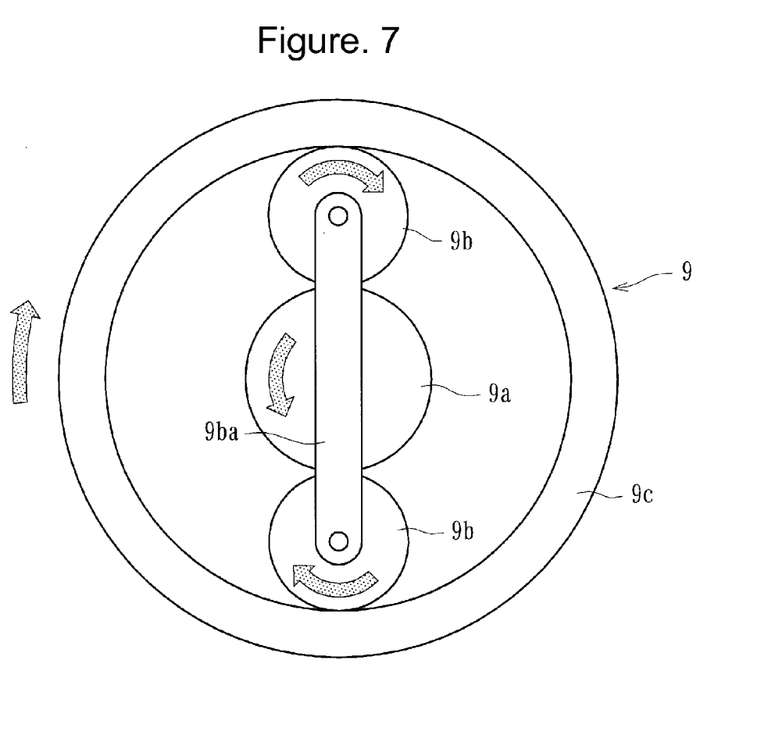
FIG. 7 is a schematic diagram of a planetary gear mechanism used in the power transmitting apparatus of FIG. 1.

The housing 10 forming part of the clutch mechanism 3 can be connected to a ring gear 9*c* of a planetary gear mechanism 9. As illustrated in FIG. 7, the planetary gear mechanism 9 can comprise a sun gear 9*a* rotatable at the center of the planetary gear mechanism 9, a pair of planetary gears 9*b* each mating with the sun gear 9*a* such that they rotate and revolve, a carrier 9*ba* extending from the planetary gears 9*b* interlocking therewith, and a ring gear 9*c* mating with the planetary gears 9*b* and rotatable therearound. When the housing 10 is rotated by the driving force of the engine E, the driving force is inputted to the ring gear 9*c* and transmitted to the output shaft 15 through the planetary gears 9*b* and the sun gear 9*a*.

Figure 4:
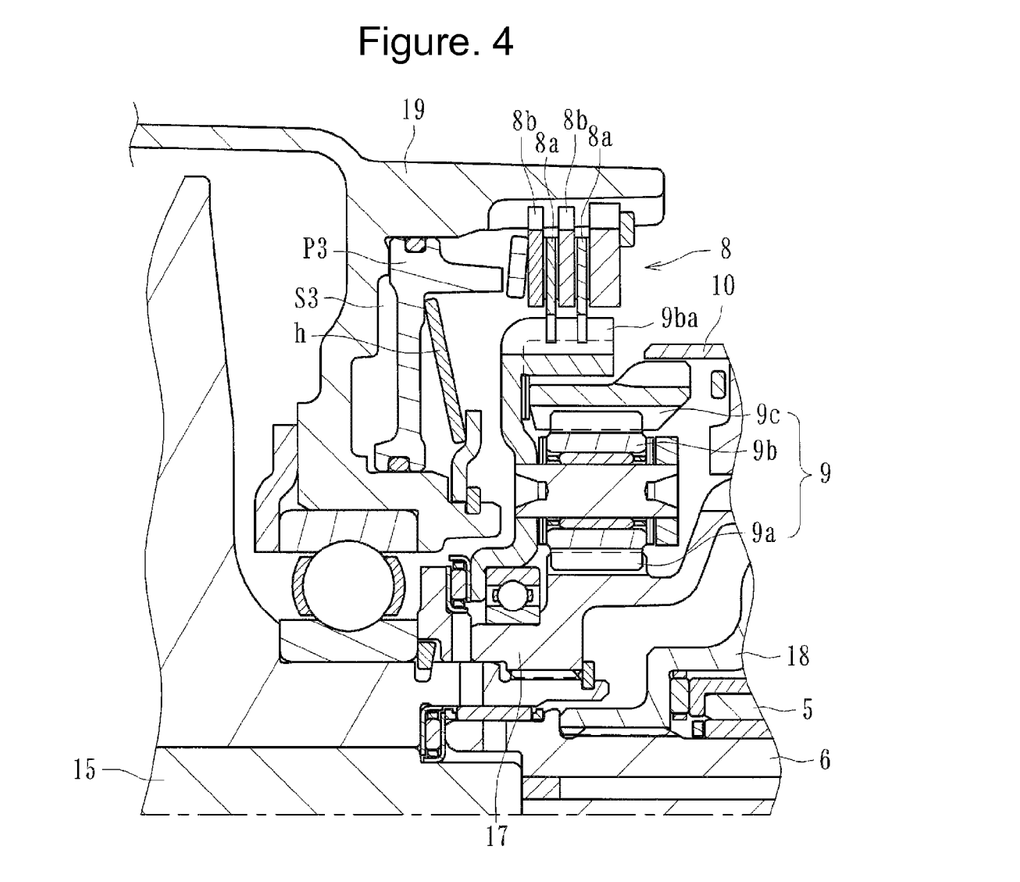
FIG. 4 is an enlarged view illustrating a third clutch device of the power transmitting apparatus of FIG. 1.

The carrier 9*ba* can be extended to the third clutch device 8 such that its rotation is allowed or restrained by the third clutch device 8. The third clutch device 8 can comprise, as illustrated in FIG. 4, driving side clutch discs 8*a* mounted on the tip end of the carrier 9*ba*, stationary clutch discs 8*b* formed on a stationary member 19, and a piston P3 for pressing together the driving side clutch discs 8*a* and the stationary clutch discs 8*b*. The hydraulic piston P3 can be moved toward the right direction in FIG. 4 against the urging force of a Belleville spring h by introducing operating oil into a hydraulic chamber S3 and pushing the third clutch device 8 with its tip end so as to press together the driving side clutch discs 8*a* and the stationary clutch discs 8*b*. Thus, the third clutch device 8 can be selectively operated by controlling the hydraulic pressure for operating the hydraulic piston P3.

The rotation of the carrier 9*ba* can be restrained by actuation of the third clutch device 8. Accordingly, when the housing 10 is rotated by the driving force of the engine E, the driving power is input to the ring gear 9*c*, the rotation of planetary gears 9*b* is reversed and driving power is transmitted to the output shaft 15 through the sun gear 9*a*. In this way, reverse vehicle operation can be achieved.

The selecting device 4 can selectively actuate the first clutch device 3*a* or the second clutch device 3*b* by selective operation of the hydraulic pistons P1 or P2 through supply of operating oil at a predetermined pressure into the hydraulic chamber S1 or S2 according to conditions (e.g. running speed of a vehicle, an inclined angle of a vehicle body etc.) of a vehicle during its forward mode to transmit the driving force of the engine E to the driving wheel D through or without the power transmitting system of the torque converter 1.

Figure 8:
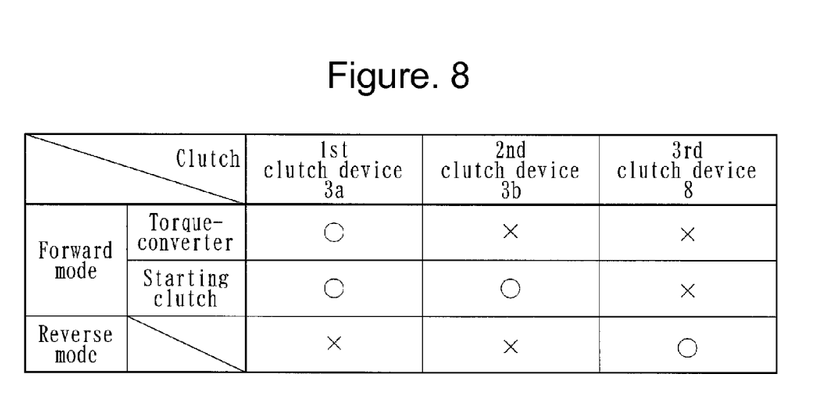
FIG. 8 is a table illustrating contents of a control program of a selecting device of the power transmitting apparatus of FIG. 1.

The selecting device 4 can be formed in an ECU (not shown) for controlling the engine E. In some embodiments, the selecting device 4 can be in the form of one or more hard-wired circuits, dedicated processors and memory, and/or a general purpose processor and memory running one or a plurality of control programs for performing the functions described herein. In embodiments where the selecting device 4 includes one or more processors, the control methods described herein can be in the form of computer implemented instructions, computer programs, modules, etc., stored in a memory device and executed by the one or more processors. In addition, various components, functions and aspects of the selecting device 4 and its components may be grouped and/or separated into sub-devices, sub modules, or separate devices. The selecting device can be programmed, as illustrated in FIG. 8, to actuate the first clutch device 3*a* and not to actuate the second and the third clutch devices 3*b*, 8 when the driving force of the engine E is transmitted to the driving wheel D through the power transmitting system of the torque converter 1 in the forward mode of a vehicle. In addition, the selecting device 4 can be controlled to actuate the second clutch device 3*b* in addition to the first clutch device 3*a* and not to actuate the third clutch device 8 when the driving force of the engine E is transmitted to the driving wheel D without the power transmitting system of the torque converter 1.

In addition, in reverse vehicle operation, the selecting device 4 can be controlled, as illustrated in FIG. 8, so that the first and second clutch devices 3*a*, 3*b* are not actuated and, on the other hand, the third clutch device 8 is actuated. Since the vehicle can be operated in a reverse mode by operating the third clutch device 8 as described above, the size of the power transmitting apparatus can be reduced compared with that of the prior art which includes a separate output shaft for the reverse mode.

The damper mechanism 7 for damping the torque variation can be positioned operatively between the engine E (driving source) and the torque converter 1 to transmit power between them. Thus, a lock-up clutch or a damper mechanism is not needed within the torque converter 1 and the size of the torque converter 1 can be reduced while greater options are provided for laying out the torque converter 1. Since the weight (i.e. a primary mass) of a driving source side portion and a portion from the damper mechanism to the driving source can be reduced, the load acting on the engine E can be reduced. Since the weight (i.e. a secondary mass) of a converter side portion and a portion from the damper mechanism to the torque converter can be increased, the vibration damping effect can be increased due to increase of the inertial mass.

Where the power transmitting apparatus comprises the selecting device 4 configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance with a plurality of different modes of operation of the vehicle, at least one of the modes being a starting mode, the power transmitting apparatus can be simplified, the size of the power transmitting apparatus can be reduced, the starting performance can be improved due to the torque amplifying function of the torque converter 1, and the power transmitting efficiency during steady operation of vehicle can be improved.

Since the first driving shaft 5 and the second driving shaft 6 can be arranged coaxially each other, the whole size of the power transmitting apparatus can be reduced as compared with the prior art structures in which the first and second driving shafts are arranged separated from and parallel relative to each other. Since the clutch mechanism can comprise the first clutch device 3a, the second clutch device 3b and two hydraulic pistons P1, P2 corresponding respectively to the first and second clutch devices 3a, 3b all contained in the same housing 10, and that the first and second clutch devices 3a, 3b can be selectively actuated by controlling the hydraulic pressure for actuating the hydraulic pistons P1, P2, the power transmitting apparatus can be simplified and its size reduced.

Figure 6:
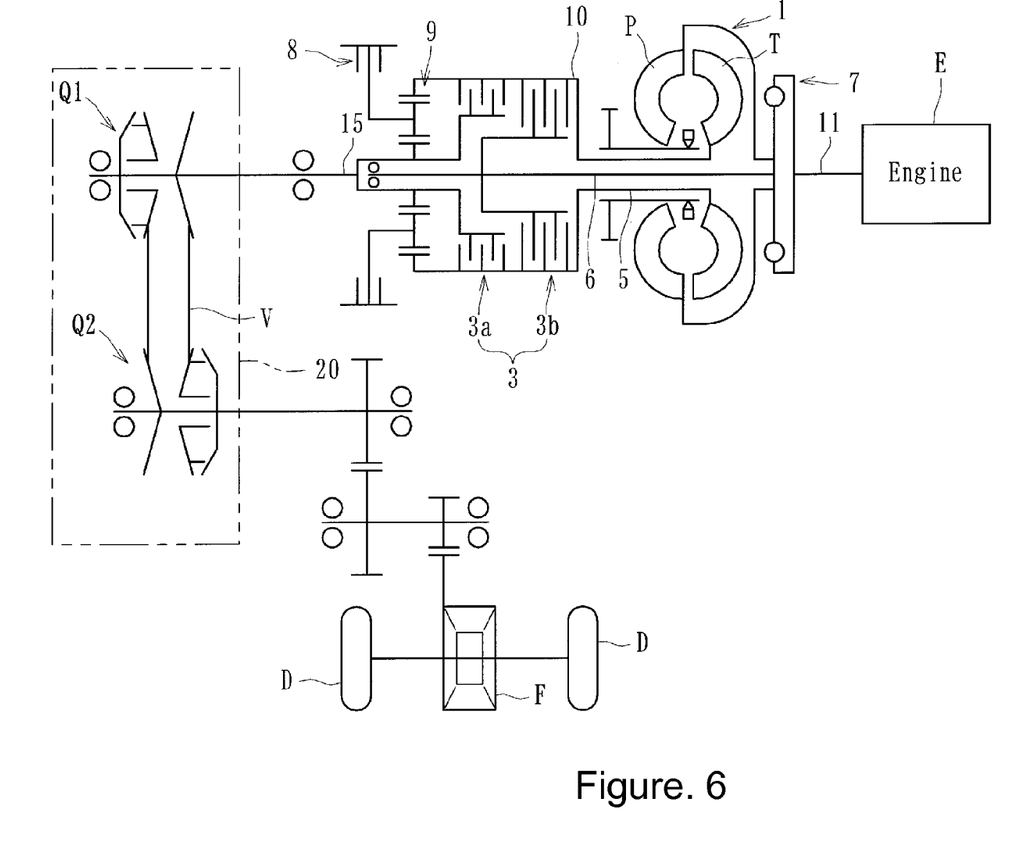
FIG. 6 is a schematic diagram of a power transmitting apparatus in which a variable speed unit A comprises a continuously variable speed unit.

The variable speed unit A can be an automatic variable speed unit, or a continuously variable speed unit 20 (e.g. CVT: Continuously Variable Transmission) as illustrated in FIG. 6. In this case, the continuously variable speed unit 20 can be operatively positioned between the second clutch device 3b of the clutch mechanism 3 and the driving wheels D to transmit power between them.

Such a continuously variable speed unit 20 can comprise two pulleys Q1, Q2 and a belt V extending therebetween and can achieve a desired speed by independently changing diameters of the pulleys Q1, Q2 on which the belt V runs by a hydraulic pressure control circuit. The continuously variable speed unit 20 can further comprise a CVT ECU electrically connected to a brake switch of a brake pedal, a position sensor of a shifting lever, an engine ECU (not shown) etc. The hydraulic control circuit can be controlled by the CVT ECU. The hydraulic pistons P1-P3 previously described can be controlled by the hydraulic pressure control circuit.

In embodiments where an automatic variable speed unit is operatively interposed between the clutch mechanism 3 and the driving wheel D, the driving force and running condition can be easily adjusted for fuel efficiency. The provision of a continuously variable speed unit 20, as illustrated in FIG. 6, permits continuous adjustment to attain a desirable driving force and fuel consumption. The vehicle can comprise a differential gear F (FIG. 6).

Although the present inventions have been described above, the present inventions are not limited to that described and shown herein. For example, the selecting device 4 can be configured such that it can select an operating mode in accordance with inclination angle of a vehicle body. Although certain embodiments have been disclosed wherein the first and second driving shafts 5 and 6 are coaxially arranged relative to each other, they can be separated from and arranged parallel relative to each other in some embodiments.

Although certain embodiments have been disclosed wherein reverse vehicle operation is achieved by a combination of the third clutch device 8 and the planetary gear mechanism 9, in some embodiments the vehicle can have a reverse operation mode with a separately arranged output shaft dedicated to the reverse operation mode. The driving source is not limited to the engine E and other driving sources, e.g. an electric motor, can be used. Although certain embodiments have been disclosed herein the selecting device 4 is formed in the ECU, the selecting device can be formed in a separately arranged microcomputer, for example.

What is claimed is:

1. A power transmitting apparatus for selectively transmitting power from a driving source of a vehicle to wheels of the vehicle, comprising:
   a torque converter having a torque amplifying function and configured to transmit power from the driving source to the wheels, the torque converter comprising a first and second torque converter cover and a pump housed within the first and second torque converter covers;
   a transmission operatively positioned between the driving source and the wheels,
   a clutch mechanism comprising a first clutch device configured to transmit a driving force of the driving source to the wheels through the torque converter so as to move the vehicle and a second clutch device configured to transmit the driving force of the driving source to the wheels without the power transmitting system of the torque converter so as to move the vehicle, the clutch mechanism being within the transmission;
   a selecting device configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode;
   a damper mechanism for damping torque variation, the damper mechanism located outside the first and second covers of the torque converter, and configured to transmit power between the driving source and the torque converter, the damper mechanism being positioned between the driving source and the torque converter, and wherein there is no lock-up clutch inside the first and second covers of the torque converter; and
   a variable speed unit within the transmission.

2. The power transmitting apparatus of claim 1, further comprising:
   a first driving shaft connected to the first clutch device and configured to be rotated by the driving force of the driving source transmitted through the power transmitting system of the torque converter;
   a second driving shaft connected to the second clutch device and configured to be rotated by the driving force of the driving source without the power transmitting system of the torque converter; and wherein the first driving shaft and the second driving shaft are arranged coaxially relative to each other.

3. The power transmitting apparatus of claim 1, further comprising a housing, and two hydraulic pistons which correspond respectively to the first and second clutch devices, and wherein the first clutch device, the second clutch device, and the two hydraulic pistons are all contained in the housing, and wherein the first and second clutch devices are configured to be selectively actuated by controlling a hydraulic pressure for actuating the hydraulic pistons.

4. The power transmitting apparatus of claim 1, wherein the variable speed unit comprises an automatic variable speed unit configured to transmit power between the clutch mechanism and the wheels.

5. The power transmitting apparatus of claim 1, wherein the automatic variable speed unit comprises a continuously variable speed unit.

* * * * *

UNITED STATES PATENT AND TRADEMARK OFFICE
CERTIFICATE OF CORRECTION

PATENT NO. : 8,413,546 B2
APPLICATION NO. : 13/160425
DATED : April 9, 2013
INVENTOR(S) : Ohashi et al.

It is certified that error appears in the above-identified patent and that said Letters Patent is hereby corrected as shown below:

On the Title Page Item [73], delete "Kabushiki Kaisha F.O.C.," and insert

--Kabushiki Kaisha F.C.C.,--.

Signed and Sealed this
Twenty-fourth Day of June, 2014

Michelle K. Lee
*Deputy Director of the United States Patent and Trademark Office*